United States Patent
Paulsen, Jr. et al.

(10) Patent No.: US 7,363,490 B2
(45) Date of Patent: Apr. 22, 2008

(54) METHOD AND SYSTEM FOR SELECTIVE EMAIL ACCEPTANCE VIA ENCODED EMAIL IDENTIFIERS

(75) Inventors: Robert C. Paulsen, Jr., Austin, TX (US); Cornell G. Wright, Jr., Austin, TX (US)

(73) Assignee: International Business Machines Corporation, Armonk, NY (US)

(*) Notice: Subject to any disclaimer, the term of this patent is extended or adjusted under 35 U.S.C. 154(b) by 759 days.

(21) Appl. No.: 10/242,232

(22) Filed: Sep. 12, 2002

(65) Prior Publication Data

US 2004/0054887 A1    Mar. 18, 2004

(51) Int. Cl.
H04L 9/00 (2006.01)
G06F 11/00 (2006.01)
G06F 12/14 (2006.01)
G06F 12/16 (2006.01)
G06F 15/18 (2006.01)
G06F 23/00 (2006.01)

(52) U.S. Cl. .......... 713/154; 726/22; 726/23; 726/24; 726/25

(58) Field of Classification Search ............ 726/22–25
See application file for complete search history.

(56) References Cited

U.S. PATENT DOCUMENTS

| | | | |
|---|---|---|---|
| 5,757,916 A * | 5/1998 | MacDoran et al. | 380/258 |
| 5,930,479 A | 7/1999 | Hall | 395/200.68 |
| 5,982,897 A * | 11/1999 | Clark | 380/258 |
| 6,154,172 A * | 11/2000 | Piccionelli et al. | 342/357.1 |
| 6,266,692 B1 | 7/2001 | Greenstein | 709/206 |
| 6,321,267 B1 | 11/2001 | Donaldson | 709/229 |
| 6,453,419 B1 * | 9/2002 | Flint et al. | 726/3 |
| 6,480,885 B1 * | 11/2002 | Olivier | 709/207 |

(Continued)

FOREIGN PATENT DOCUMENTS

EP    1037436 A1    9/2000

(Continued)

OTHER PUBLICATIONS

Hall, "Channels: Avoiding Unwanted Electronic Mail", v. 38, DIMACS: Series in Discrete Mathematics and Theoretical Computer Science—Network Threats, ed. R. Wright, Dec. 1996.

(Continued)

*Primary Examiner*—Nasser Moazzami
*Assistant Examiner*—Chinwendu C Okoronkwo
(74) *Attorney, Agent, or Firm*—Hamilton & Terrile, LLP

(57) ABSTRACT

A method, system, apparatus, and computer program product are presented for providing a user with the ability to limit the receipt of unwanted email messages. An encoded email identifier is generated by combining the user's local mailbox identifier along with encoded email acceptance parameter values that represent email acceptance criteria. The encoded email identifier is then used as the local-part portion of an email address in place of the user's local mailbox identifier. After receiving an incoming email message in which the encoded email identifier is a portion of the destination address of the incoming email message, an email server delivers the email message in accordance with the local mailbox identifier that is embedded in the encoded email identifier in response to a determination that one or more characteristics of the email message satisfy one or more email acceptance criteria that are encoded within the encoded email identifier.

15 Claims, 5 Drawing Sheets

U.S. PATENT DOCUMENTS

| | | | |
|---|---|---|---|
| 7,194,515 B2* | 3/2007 | Kirsch | 709/206 |
| 2002/0007453 A1 | 1/2002 | Nemovicher | 713/155 |
| 2002/0016824 A1 | 2/2002 | Leeds | 709/207 |
| 2002/0016831 A1* | 2/2002 | Peled et al. | 709/219 |
| 2002/0032861 A1 | 3/2002 | Azuma | 713/170 |
| 2002/0165912 A1* | 11/2002 | Wenocur et al. | 709/203 |
| 2003/0105864 A1* | 6/2003 | Mulligan et al. | 709/225 |
| 2003/0167311 A1* | 9/2003 | Kirsch | 709/206 |
| 2003/0229801 A1* | 12/2003 | Kouznetsov et al. | 713/200 |
| 2005/0097179 A1* | 5/2005 | Orme | 709/207 |

FOREIGN PATENT DOCUMENTS

| | | | |
|---|---|---|---|
| JP | 2000-163341 | | 6/2000 |
| WO | WO 0046952 A1 | | 8/2000 |

OTHER PUBLICATIONS

Hall, "Specification, Validation, and Synthesis of Email Agent Controllers: A Case Study in Function Rich Reactive System Design", *Proc. of Third Workshop on Formal Methods in Software Practice*, pp. 13-23, Aug. 2000.

Bal et al., "Access Revocation and Prevention of False Repudiation in Secure Email Exchanges", *Proc. of Fifth Intl. Symposium on Autonomous Decentralized Systems*, pp. 419-425, Mar. 2001.

Ivey, "Spam: The Plague of Junk E-Mail", *The Editorial Eye*, Nov. 1997.

Hall, "How to Avoid Unwanted Email", *Comm. of the ACM*, v. 41, n. 3, pp. 88-95, Mar. 1998.

Hall, "Channels: Avoid Unwanted Communications", http://www.research.att.com/—hall/channels-project.html, Jun. 2002.

Odaka et al., "A proposal for new secure mail transfer agent software", *Transactions of the Inst. Electronics, Information, and Communication Engineers*, v. J83D-I, n. 11, pp. 1233-1235, Nov. 2000.

Safian, "Damming Spam", *Educom Review*, v. 34, n. 1, pp. 24-27, Jan. 1999.

\* cited by examiner

| ENCODED EMAIL IDENTIFER | | ~ 500 |
|---|---|---|
| BYTE | FIELD NAME | ~ 502 |
| 0-3 | RANDOM ENCRYPTION INITIALIZATION VECTOR | ~ 512 |
| 4-19 | LOCAL-PART PORTION OF USER'S EMAIL ADDRESS | ~ 510 |
| 20 | FLAG FIELD TO INDICATE USE OF CRITERIA FIELDS | ~ 514 |
| 21-24 | VALIDITY DATE (DAYS SINCE 01/01/1970) | ~ 516 |
| 25 | NUMBER OF SOURCE DOMAIN QUALIFIERS | ~ 518 |
| 26-29 | 32-BIT CRC OF VALID SOURCE DOMAIN | ~ 520 |
| 30-39 | RESERVED | ~ 508 |

504 ~ (BYTE column label)

*FIG. 5*

METHOD AND SYSTEM FOR SELECTIVE EMAIL ACCEPTANCE VIA ENCODED EMAIL IDENTIFIERS

BACKGROUND OF THE INVENTION

1. Field of the Invention

The present invention relates to an improved data processing system and, in particular, to a method and system for multi-computer data transferring. Still more particularly, the present invention provides a method and system for multi-user communication using email.

2. Description of Related Art

The receipt of unwanted email messages is a common problem that is widely experienced by many email users. These email messages may originate from organizations or persons with which a user no longer wants to communicate, or these messages may be unsolicited, broadcast, commercial, email messages, also known as "spam". One of the factors that causes this problem is the fact that after a user's email address has been divulged, it can be used to send email for as long as the email address is valid, which is typically several years.

One solution to the spamming problem has been the implementation of address-blocking lists, which block the delivery of all email messages from a certain email address. Another solution has been to filter email messages by scanning them for undesirable content. Although effective, some previous solutions allow delivery of unwanted email messages to a user who then has the burden of filtering or blocking the messages, while other previous solutions require a substantial transfer of control or privacy from the user to a service provider that performs filtering or blocking actions on behalf of the user.

Therefore, it would be advantageous to have a method and system for providing a user with the ability to selectively control the delivery of email messages. It would be particularly advantageous to maximize the flexibility of user control while minimizing the computational burdens on a service provider that performs email processing operations on behalf of a user.

SUMMARY OF THE INVENTION

A method, system, apparatus, and computer program product are presented for providing a user with the ability to limit the receipt of unwanted email messages. An encoded email identifier is generated by combining the user's local mailbox identifier along with encoded email acceptance parameter values that represent email acceptance criteria. The encoded email identifier is then used as the local-part portion of an email address in place of the user's local mailbox identifier. After receiving an incoming email message in which the encoded email identifier is a portion of the destination address of the incoming email message, an email server delivers the email message in accordance with the local mailbox identifier that is embedded in the encoded email identifier in response to a determination that one or more characteristics of the email message satisfy one or more email acceptance criteria that are encoded within the encoded email identifier.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 5 is a block diagram that depicts an example of an encoded email identifier.

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
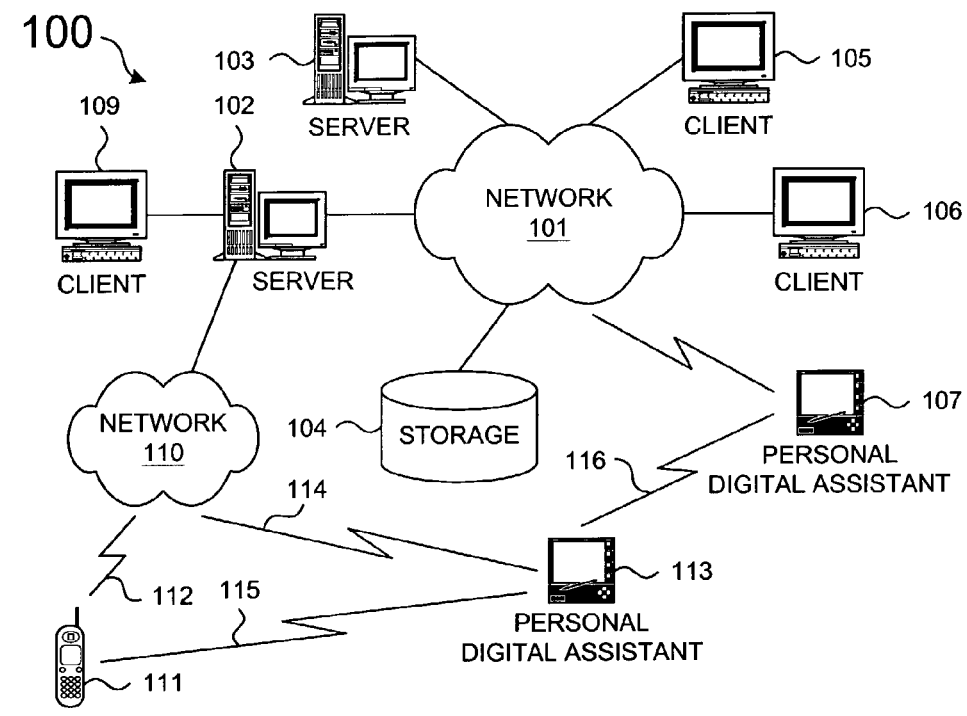
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
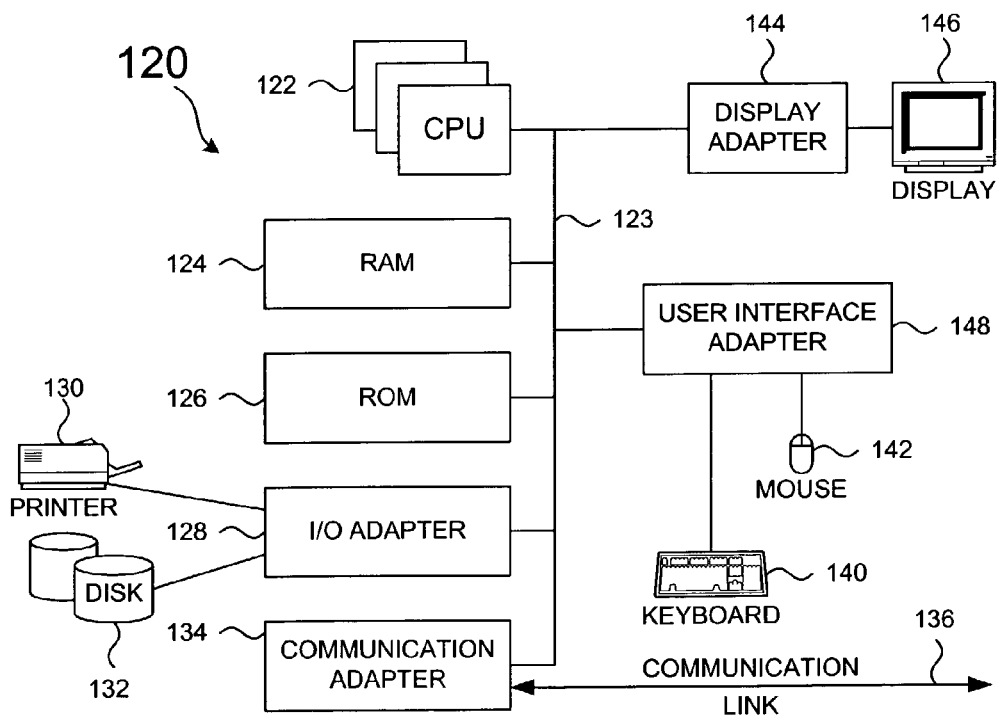
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find identical components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to a method and system for providing a user with the ability to selectively control the delivery of email messages, as explained in more detail below with respect to the description of the remaining figures.

Figure 2:
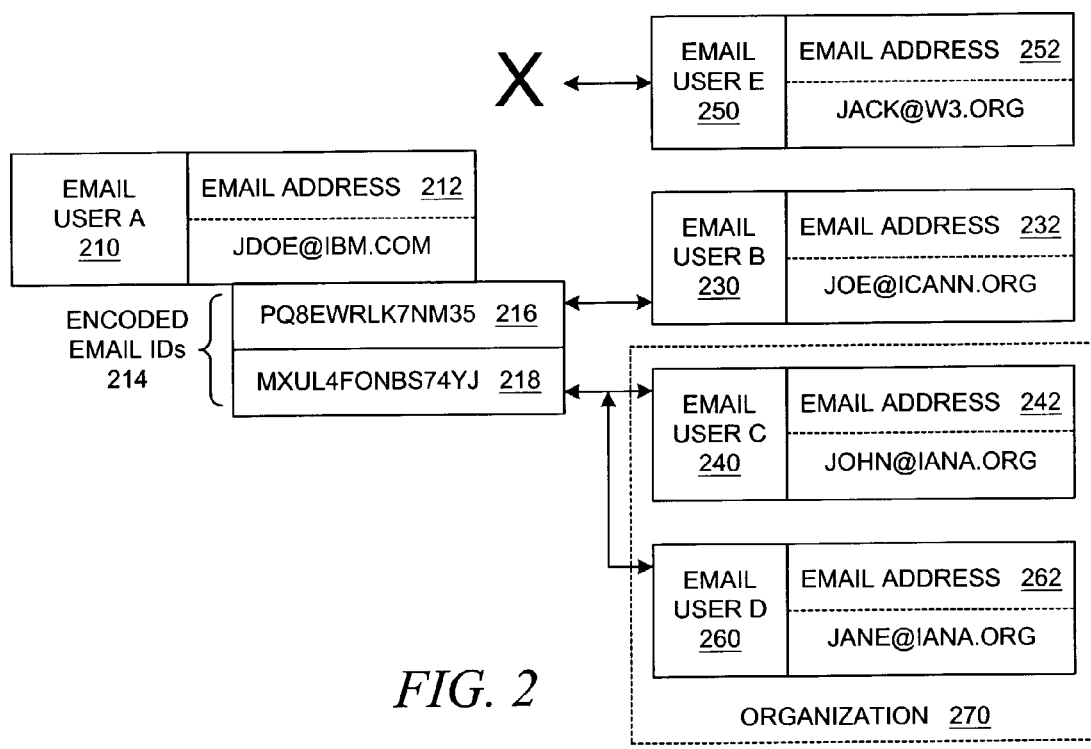
FIG. 2 depicts a logical organization of email users who may use encoded email identifiers within email communication in accordance with the present invention.

With respect to FIG. 2, a block diagram depicts a logical organization of email users who may use encoded email identifiers within email communication in accordance with the present invention. Email user 210 is associated with email address 212 in a well-known manner. Typically, an email user belongs to an organization or subscribes to a service provider that sends and receives email messages on behalf of the email user with respect to the user's email address in accordance with Internet-related standards and specifications. As an example, an email address has the form "local-part@domain" where the domain portion of the email address is assigned to a host system and the local-part portion of the email address is assigned to a subsystem connected to the host system or to a user. The local-part portion of the email address is also commonly referred to as a user name or identifier, a local email name or identifier, or a mailbox name or identifier. The domain portion of an email address can be translated into an Internet address for a destination host system via a Domain Name System (DNS) lookup operation. The local-part portion of an email address is a string that is locally interpretable by a destination host system after receiving an email message, i.e., a domain-dependent string, such that the local host can perform some type of processing on a received email message, such as directing the email message to a mailbox, which is a destination that may comprise a print operation, a file storage operation, or some other functionality. More information about email messages are available in the following documents: "Standard for the format of ARPA Internet text messages", D. Crocker, 08/1982, Internet Engineering Task Force (IETF) RFC 822; and "Internet Message Format", P. Resnick, 04/2001, IETF RFC 2822.

The present invention introduces the concept of an encoded email identifier (ID). Referring again to FIG. 2, a set of encoded email identifiers 214 is associated with email address 212, which in the example is shown as "JDOE@IBM.COM". An encoded email identifier is used in place of a local-part portion of an associated email address. In the example shown in FIG. 2, encoded email ID 216 or encoded email ID 218 may be used by email user 210 in place of the local-part portion of email address 212, i.e., "JDOE", when corresponding with other email users.

As explained in more detail further below with respect to FIG. 5, the local-part of a user's actual email address becomes part of the information that is used to generate an encoded email identifier. More generally, an encoded email ID specifies a set of criteria; the criteria are stored within predefined fields in the string of the encoded email ID. An encoded email ID within a destination email address of an incoming email message is validated with respect to the incoming email message. If the incoming email message has certain characteristics, i.e., comprises information, that satisfy the criteria in the encoded email ID, then the encoded email ID is considered to be valid with respect to that particular incoming email message, and the incoming email message is accepted and then delivered to the destination mailbox. By using an encoded email ID, a user can limit the time, source address, or other criteria for which the encoded email ID is valid, thereby limiting the number of unwanted email messages that are received. An encoded email ID may be encrypted for security purposes, e.g., to reduce or eliminate the possibility that an entity could spoof a valid encoded mail ID.

A user or entity that is considered to possess an email address can also be considered to possess an encoded email identifier. It should be noted that email addresses, and therefore encoded email identifiers, are embedded within both outgoing email messages and incoming email messages with respect to a user who possesses an encoded email identifier. However, the purpose of an encoded email identifier is to limit the acceptance of incoming email messages that are addressed to a user. Hence, most of the following examples use terminology in which the terms "originator" or "source" refer to a user or entity that has sent an email message to a destination or target user that possesses an encoded email identifier, i.e., the target user that possesses an encoded email identifier is the focus of the particular example. In addition, the flow of email messages, i.e., incoming and outgoing email messages, are viewed from this destination user's perspective.

It should be noted that multiple encoded email identifiers can be associated with a single email address; in other words, there may be a many-to-one relationship between many encoded email identifiers and an email address.

While email addresses and encoded email identifiers are usually associated with users, email addresses and encoded email identifiers can also be associated with data processing entities. Although the following examples focus on users, it should be noted that the examples are also applicable to data processing entities.

As noted above, an encoded email ID is only valid for certain criteria. A likely criteria for an encoded email ID would be the identity of the originator of an incoming email message, in which case, an encoded email ID may be valid only with respect to a single originator of incoming email messages. However, as explained in an example further below, an encoded email ID may be valid with respect to a limited set of originators of incoming email messages. Hence, a significant difference between an encoded email ID and an email address is the fact that an email address may be used successfully by any originator of an incoming email message but an encoded email ID may be used successfully only by one originator or by limited sets of originators of an incoming email message.

An encoded email ID is considered to be associated with only one destination email address, i.e., with only one destination user or destination mailbox. For example, referring again to FIG. 2, email user 230 is associated with email address 232. It can be assumed that email user 230 possibly knows encoded email ID 216 or, more likely, email user 230 has information for encoded email ID 216, e.g., by having a stored email address in an electronic address book or in an email application or by possessing an email message from email user 210 that contains an email address with a local-part portion comprising encoded email ID 216. When email user 230 sends an email message that has a destination or "TO:" email address comprising encoded email ID 216, email user 210 receives the email message from email user 230 because encoded email ID 216 is valid in accordance with certain criteria. These criteria may include a variety of validatable values, one of which may be the identity of email user 230 as represented by the source or "FROM:" email address that is contained within the received email message, i.e., the email address that is associated with email user 230. These criteria are checked by processes and/or apparatuses during the delivery of the email message from email user 230 to email user 210, as explained in more detail further below.

In a similar manner, email user 240 is associated with email address 242, and it can be assumed that email user 240 knows encoded email ID 218. When email user 240 sends an email message that has a destination or "TO:" email address comprising encoded email ID 218, email user 210 receives the email message from email user 240 because encoded email ID 218 is valid in accordance with certain criteria.

As should be apparent by the examples discussed above, email users 230 and 240 have previously received an encoded email ID from email user 210 in some manner, and email users 230 and 240 can send email messages to email user 210 using certain encoded email IDs. In the case of email user 250, which is associated with email address 252, email user 210 has not created an encoded email ID that is valid with respect to email user 250. Email user 250 could learn an encoded email ID; for example, encoded email ID 216 or encoded email ID 218 could be gleaned from an email message from email user 210 that was received by email user 230 or 240 and then forwarded to email user 250. Email user 250 could then attempt to send an email message that has a destination or "TO:" email address comprising an encoded email ID to email user 210. However, email user 210 will not receive the email message from email user 250 because the encoded email ID would not be valid with respect to email user 250.

In another scenario, email user 210 has not specifically created a unique encoded email ID that is valid with respect to email user 260. In a manner similar to that described above for email user 250, email user 260 could learn an encoded email ID; for example, encoded email ID 218 could be gleaned from an email message from email user 210 that was received by email user 240 and then forwarded to email user 260. Email user 260 could then attempt to send an email message that has a destination or "TO:" email address comprising an encoded email ID to email user 210.

In contrast to the scenario described above with respect to email user 250, though, email user 210 will receive the email message from email user 260 under certain circumstances because encoded email ID 218 can be generated to be valid with respect to both email user 240 and email user 260, or more specifically, all members of organization 270. In particular, encoded email ID 218 can be generated to include an acceptance criterion that is based on the domain portion of the email addresses of all members of organization 270, e.g., domain "IANA.ORG" that is contained within email addresses 242 and 262. Since email user 240 and email user 260 are members of the same organization 270, thereby sharing the same domain name in the domain portion of their email addresses, and since encoded email ID 218 is valid with respect to all members of organization 270, encoded email ID 218 may be used by email user 240 and email user 260 to address an email message that will be received by email user 210. These scenarios are described again after a more detailed description of the invention is provided further below.

Figure 3:
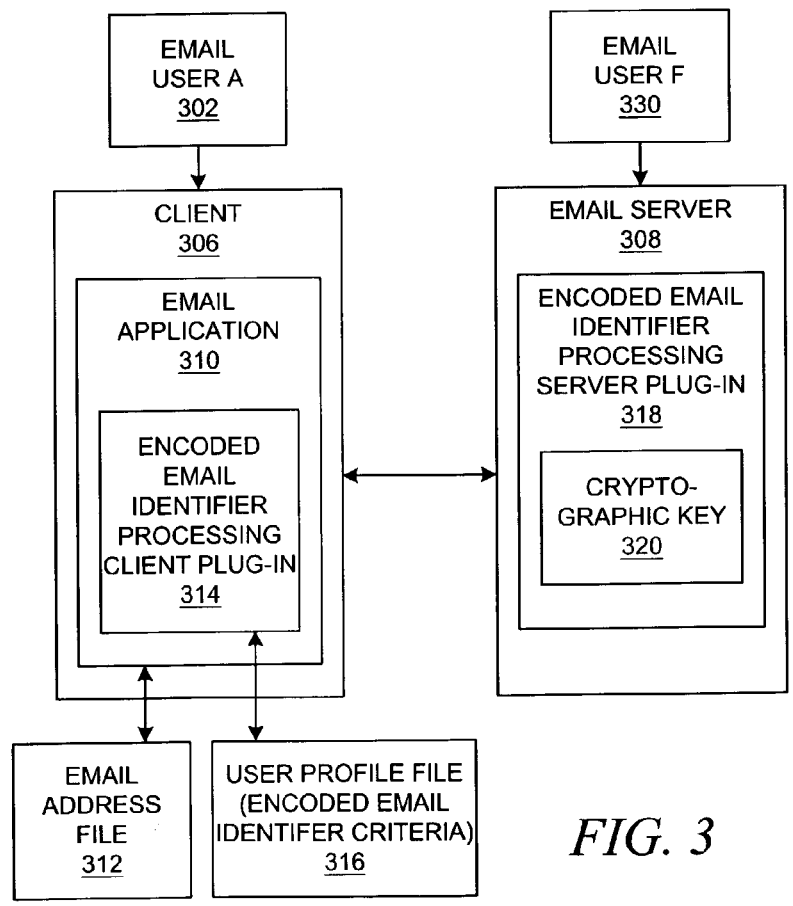
FIG. 3 depicts a distributed data processing environment that includes functionality for determining acceptance of email messages in accordance with encoded email identifiers.

With reference now to FIG. 3, a block diagram depicts a distributed data processing environment that includes functionality for determining acceptance of email messages in accordance with encoded email identifiers. Email users 302 and 330 in FIG. 3 are similar to email users 210 and 230 in FIG. 2. Client 306 and email server 308 are similar to any device in FIG. 1 that may operate as a client or server or both, e.g., client 106 and server 102. Client 306 supports email application 310, which may be a typical email application that stores email addresses in an email address book or database, such as file 312. Email server 308 supports email message processing in accordance with well-known protocols and standards.

The functionality of the present invention may be fully integrated into clients and servers in an appropriate manner. Alternatively, as shown in the example in FIG. 3, email application 310 and email server 308 are extensible to include the functionality of the present invention. More specifically, email application 310 supports the execution of encoded email identifier processing client plug-in 314, which manages encoded email identifiers on behalf of user 302. For example, client plug-in 314 may present a graphical user interface that allows a user to choose criteria to be embedded within encoded email identifiers, and client plug-in 314 may generate encoded email identifiers when necessary from the user's criteria, which may be stored in user profile file 316. Alternatively, encoded email identifier criteria are stored with email addresses in file 312 or in some other database. It should be noted that the manner in which the encoded email identifier criteria are stored and/or managed is not essential to an embodiment of the present invention.

Email server 308 supports the execution of encoded email identifier processing server plug-in 318, which may generate the encoded email identifiers using cryptographic key 320. In addition, server plug-in 318 may determine whether email messages that are received by email server 308 contain valid encoded email identifiers as determined by the criteria that are embedded in the encoded email identifiers. The functionality of the present invention at the client and the email server are described in more detail below with respect to FIGS. 4A-4E.

Figure 4A:
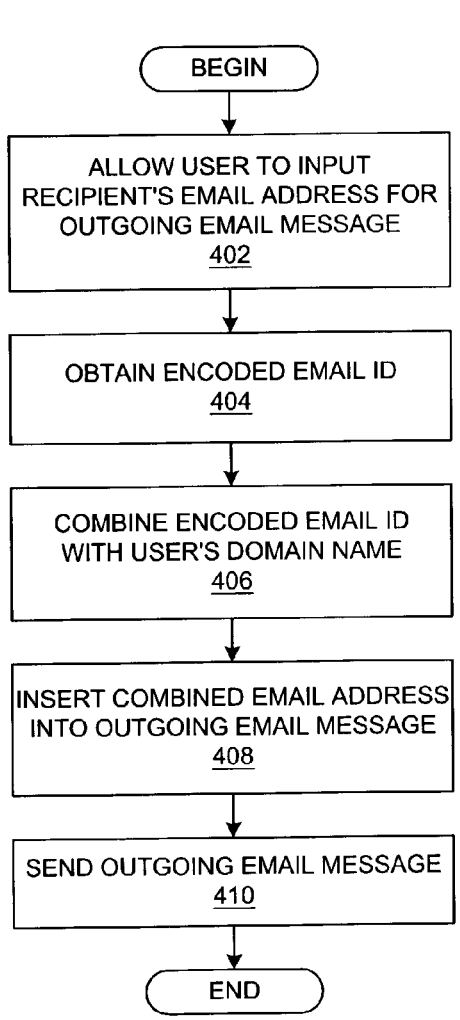
FIG. 4A is a flowchart that depicts a process within an email client application for sending an email message in which the email address from the originator comprises an encoded email identifier.

With reference now to FIG. 4A, a flowchart depicts a process within an email client application for sending an email message in which the email address from the originator comprises an encoded email identifier. The process shown in FIG. 4A is similar to a well-known process of preparing and sending an email message from an originating user to a recipient user. However, the process shown in FIG. 4A comprises additional steps for obtaining and placing an encoded email identifier into an outgoing email message.

Assuming that the content of an outgoing email message has already been generated or inputted, the process begins with an email client application allowing an originating user to select or to input an email address for a recipient of the outgoing email message (step 402). The email client application obtains an encoded email ID (step 404). The email client application combines the encoded email ID with the originating user's domain to form a combined email address (step 406) and inserts the combined email address into the "FROM:" field of the email message (step 408). The email client application then sends the email message to the recipient using the email address of the recipient (step 410), which is stored in the "TO:" field of the email message, and the process is complete.

Figure 4B:
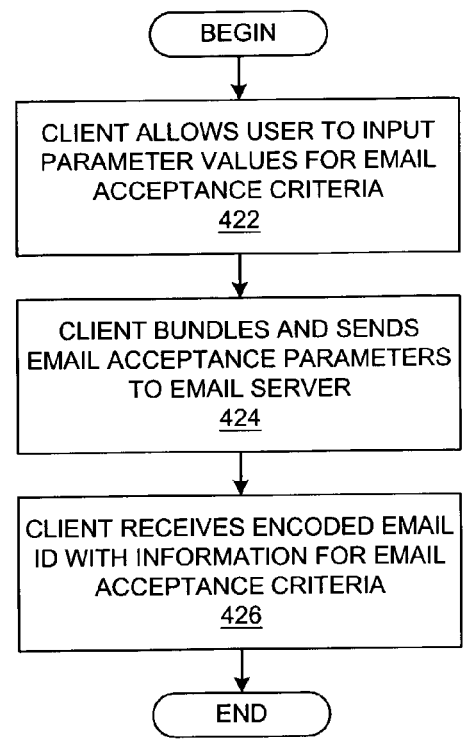
FIG. 4B is a flowchart that depicts a process within an email client application for obtaining an encoded email identifier.

With reference to FIG. 4B, a flowchart depicts a process within an email client application for obtaining an encoded email identifier. FIG. 4B shows further detail for step 404 in FIG. 4A. The process begins after an email client application has determined that an encoded email ID needs to be generated for a recipient of an outgoing email message. The email client application allows a user to input or to select parameter values for email acceptance criteria that will eventually be applied against incoming email messages that are addressed to the user from the recipient of the currently outgoing email message (step 422). The client application then bundles and sends the email acceptance parameters along with the user's email address or the local-part portion of the user's email address to the email server that handles the user's incoming email (step 424), such as email server 308 in FIG. 3. The message format and the protocol for transferring this data from the client to the email server may vary depending on the implementation of the present invention; in order to guard against snooping by third parties, the data may be sent over a secure communication link or otherwise encrypted. At some later point in time, the email client application receives from the email server an encoded email identifier comprising information for email acceptance criteria (step 426), and the process is complete.

Figure 4C:
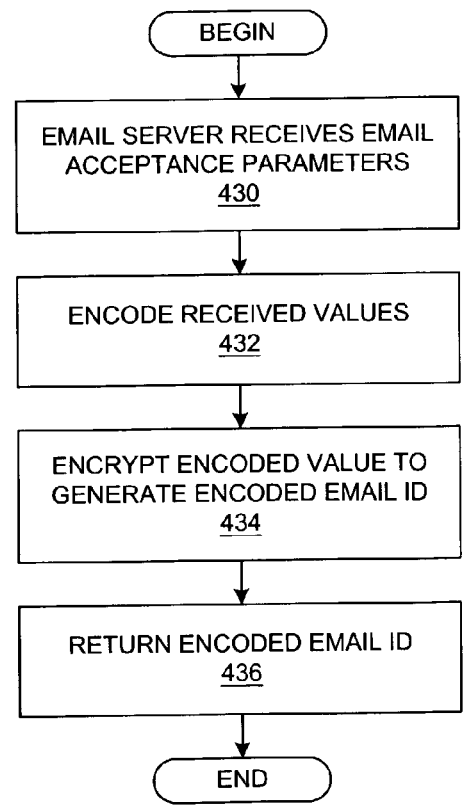
FIG. 4C is a flowchart that depicts a process at an email server for generating an encoded email identifier.

With reference to FIG. 4C, a flowchart depicts a process at an email server for generating an encoded email identifier. FIG. 4C shows further detail for the time period between steps 424 and 426 in FIG. 4B. The process begins with an email server receiving email acceptance parameters in a message along with a user's email address or a local-part portion of a user's email address (step 430). As briefly mentioned above, the format of the message containing the acceptance parameters and the protocol for transferring the message between the client and the email server may vary as the present invention is not dependent on the manner in which these are implemented. The email server encodes the received parameters to generate an encoded value (step 432), and the email server then preferably encrypts the encoded value to generate an encoded email ID (step 434). The email server sends the encoded email ID to the originating client (step 436), and the process is complete.

Figure 4D:
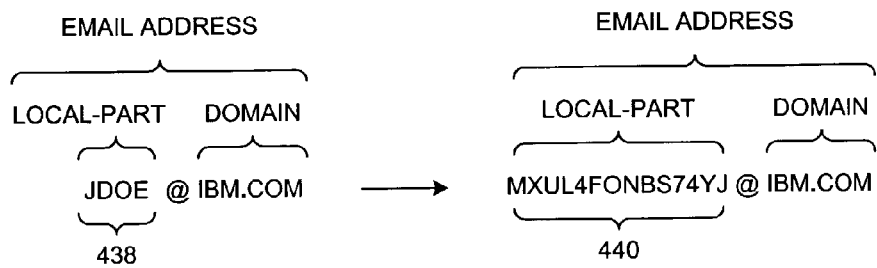
FIG. 4D is a simple diagram that depicts the manner in which an encoded email ID is substituted for a local-part portion of a user's email address.

With reference now to FIG. 4D, a simple diagram depicts the manner in which an encoded email ID is substituted for a local-part portion of a user's email address. Continuing the example in FIG. 2 into the example shown in FIG. 4D, local-part portion 438 of a user's email address represents a user-name value that is associated with a mailbox within an email system. After an encoded email ID has been generated based on the user's email address and any user-selected email acceptance criteria, the encoded email ID is used in local-part portion 440 of a combined email address.

Figure 4E:
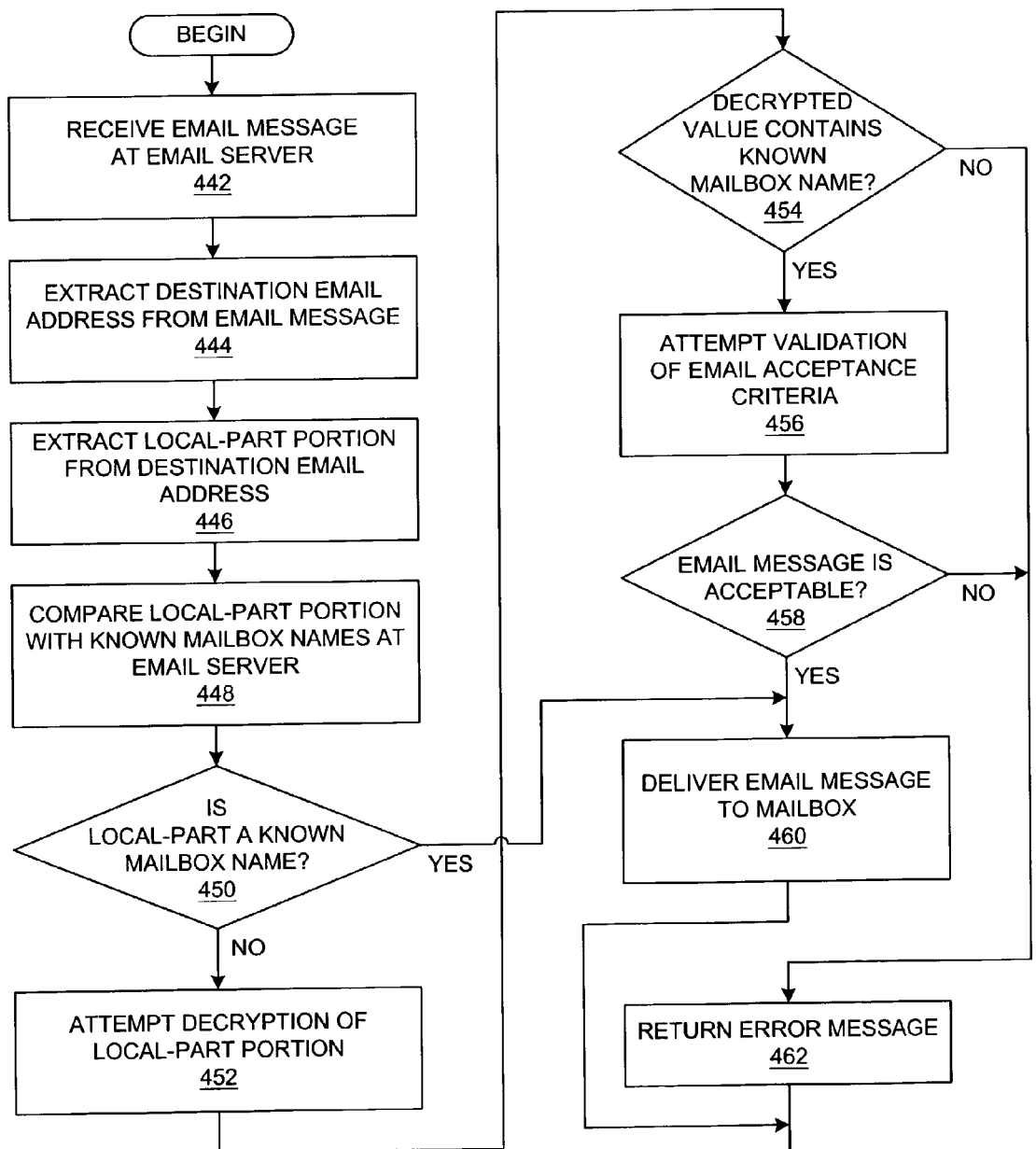
FIG. 4E is a flowchart that depicts the processing that occurs in an email server when it checks the characteristics of an incoming email message in which an encoded email ID is found against the email acceptance criteria from the encoded email ID in order to determine whether the incoming email message is acceptable for delivery to a user or a mailbox that is indicated within the encoded email ID.

With reference now to FIG. 4E, a flowchart depicts the processing that occurs in an email server when it checks the characteristics of an incoming email message in which an encoded email ID is found against the email acceptance criteria from the encoded email ID in order to determine whether the incoming email message is acceptable for delivery to a user or a mailbox that is indicated within the encoded email ID. The process begins when an email server receives an email message (step 442) and extracts the destination or "TO:" email address from the received email message (step 444). The local-part portion of the email address is then extracted from the destination email address (step 446).

The extracted local-part portion string is compared against all of the user names within the domain that is served by the email server (step 448), and a determination is made as to whether the email server recognizes the local-part portion string as a user name (step 450). If so, then the process branches to deliver the email message to the proper mailbox. If the local-part portion string is unknown as a user name, then an attempt is made to decrypt the local-part portion string with the email server's encryption key (step 452), and a determination is made as to whether the decrypted value contains a known user name (step 454). For example, if the original email address in the incoming email message contained an encoded email ID, then the local-part portion string contains a user name as one of the string's fields along with encoded criteria for determining the acceptance of the incoming email message. In a manner similar to checking the original email address, the email server can compare the user name from the local-part portion string against all of the user names within the domain that is served by the email server.

If the decrypted value contains a known user name, then the email server attempts to determine whether the characteristics of the incoming email message satisfy the acceptance criteria that are specified by the encoded criteria in the other fields of the decrypted value (step 456). A determination is made as to whether or not the email message is acceptable (step 458), and if so, then the email server delivers the email message to the proper mailbox (step 460), and the process is complete.

If the incoming email message does not have the proper characteristics as indicated by the acceptance fields, as determined at step 458, or if the decrypted value did not contain a user name as known to the current email server, as determined at step 454, then an error message can be returned to the originator of the incoming email message (step 462), and the process is complete.

It can be understood in view of FIGS. 4A-4D that encoded email identifiers would likely be generated on an as-needed basis, most likely when a reply email address is needed within an outgoing email message. However, an email client application may enable a user to create, modify, or delete encoded email identifiers at will.

With reference now to FIG. 5, a block diagram depicts an example of an encoded email identifier. Encoded email identifier 500 comprises a set of fields 502 at indicated byte ranges 504; the fields of an encoded email ID comprise values for the email acceptance parameters that represent criteria to be applied against an incoming email message to determine whether or not the incoming email message should be delivered by an email server, as explained with reference to FIG. 4E above. Field 508 is a reserved field that shows that some of the bytes within an encoded email ID may remain unused.

Field 510 contains the local-part portion of a user's email address, e.g., a user name or a mailbox name. When an email server is generating the encoded email ID, as described above with respect FIG. 4C, i.e., before the encoded email ID is encrypted, it can be assumed that the user's email address belongs to a user who is operating an email client application that requested the generation of the encoded email ID. When an email server is analyzing an encoded email ID that has been extracted from an incoming email message, as described above with respect FIG. 4E, i.e., after the encoded email ID has been decrypted, it can be assumed that the user's email address belongs to a user to whom the incoming email message is addressed.

In other words, FIG. 5 depicts the fields in an encoded email identifier either before or after encryption. The present invention is not dependent upon any particular cryptographic methods; an encoded email ID may be encrypted using a variety of cryptographic algorithms. A possible encryption method is the Rinjdael symmetric encryption algorithm used in chained block cypher mode with a moderate block and key size; in this example, field 512 contains a random encryption initialization vector to be used by the algorithm.

It should be noted that an email server may employ more than one cryptographic key to limit the impact of key exposure or loss. It should also be noted that some criteria fields, e.g., the validity date, could remain unencrypted so that the originator of the email message could choose not to attempt to send an email message if the originator can determine that the email message would not be accepted.

Field 514 is a bit-flag field that indicates which of the subsequent fields in the encoded email ID are used; in other words, not all criteria need to be specified within a particular encoded email ID. Field 516 contains a validity date that is encoded in the number of days since Jan. 1, 1970. The validity date indicates that last valid day for which the encoded email ID may be used; if an incoming email message is sent after that date, or alternatively, is received after that date, then the email message would be determined to be unacceptable. A validity date ensures that a user can set a date after which an encoded email ID expires and cannot be used.

Field 518 contains a number of source domain qualifiers that are examined for validity in the originator's email address in the source address of an incoming email message.

Field 520 contains a 32-bit cyclic redundancy check code (CRC) of a valid source domain, i.e., a valid source domain in an originator's email address in the source address of an incoming email message when an email server is validating an encoded email ID. As mentioned above, in order to reduce the delivery of unwanted email messages, it is likely that a user of encoded email identifiers would indicate that only email messages from certain source domains are acceptable. However, a valid domain name can be much longer than the space that is available to accommodate this information within an encoded email ID, so a valid domain name is reduced to a much smaller representational value using some type of checksum algorithm or hashing algorithm. When an email server receives an incoming email message, the domain portion of the originator's email address is reduced using the same reduction algorithm, and the computed value can be compared with the value within the encoded email ID. If they match, then the originator's domain is valid with respect to the encoded email ID.

It should be noted that after an email server has encrypted the encoded email ID, the encrypted value must be mapped or expanded into a character string that can be processed by email servers in accordance with known standards. Various algorithms could be used to transform the encrypted value into valid characters. For example, base-32encoding would represent each 5-bit portion of the encrypted value as one of 32characters.

It should be understood that it is likely that the entity that generates an encoded email ID on behalf of a user or a client device is the same entity that analyzes an encoded email ID that has been extracted from an incoming email message. For example, referring again to FIG. 3, a particular email server may both generate an encoded email ID and also analyze the encoded email ID at some later time with respect to an incoming email message. Although it is likely that the same entity performs both operations, it should be noted, however, that different entities may generate an encoded email ID and then later analyze the encoded email ID. For example, an email server that knows the encryption key that was used to generate the value that is placed in field 512 could decrypt an encoded email ID, although the distribution of a cryptographic key introduces some security risks. In addition, an email server that knows the reduction algorithm that was used to generate the value that is placed in field 520 could evaluate the incoming value. As an alternative, the type of reduction algorithm could be indicated as a parameter in the encoded email ID.

Referring again to FIG. 2, the scenarios for using an encoded email ID can be described again with respect to the description of FIGS. 3-5. When user 240 sends an email message to user 210, an email server that handles incoming email messages for user 210 would check whether the destination email address in the incoming email message contains a known user name, which would be embedded in a field of the encoded email ID, i.e., the local-part portion of the destination email address. After extracting the user name for user 210, i.e., "JDOE", from the decoded value, the email server would determine that it recognizes this user name.

The email server would then determine whether the specified email acceptance criteria in the decoded value are satisfied with respect to the incoming email message. In this example, user 210 may have placed a restriction on the originating user's domain name such that only users with email addresses within a particular domain, i.e., "IANA.ORG", can use a particular encoded email ID, i.e., encoded email ID 218. The email server would extract the domain portion of the source email address from the incoming email message, i.e., "IANA.ORG", and the email server would then use the domain portion string as an input to a reduction algorithm. If the computed value matches the value stored in the decoded email ID, then the incoming email message has originated from a user from whom user 210 has previously specified that user 210 is willing to accept email messages. If the other acceptance criteria are satisfied, then the incoming email message is delivered to user 210.

Continuing with a previous usage scenario from FIG. 2 and the exemplary encoded email ID shown in FIG. 5, if user 250 attempts to send an email message to user 210 with encoded email ID 218, the incoming email message will not be delivered to user 210. The email server would extract email address 252 from the incoming email message, and using the domain portion of email address 252, i.e., "W3.ORG", as input into the reduction algorithm, the computed value would not match the value stored in the decoded email ID from the incoming email message because encoded email ID 218 was generated to indicate the "IANA.ORG" domain. Hence, an incoming email message using encoded email ID 218 is not acceptable from the "W3.ORG" domain, and the email server would not deliver the incoming email message.

The advantages of the present invention should be apparent in view of the detailed description that is provided above. Using encoded email identifiers that have been generated for specific originators of incoming email messages and/or for other specific acceptance criteria, a user can restrict the delivery of incoming email messages, and the acceptance criteria can be encrypted so that it is difficult to spoof. In addition, the acceptance criteria are embedded within the local-part portion of an email address such that the acceptance criteria do not have to be stored and/or maintained at an email server prior to the email server receiving an incoming email message that contains an encoded email ID, which significantly reduces the administrative costs associated with providing email delivery controls that are selectable by a user. Moreover, an email client application is not burdened with undesirable messages because incoming email messages that fail to meet the user's selected criteria are not delivered to the user's mailbox.

It is important to note that while the present invention has been described in the context of a fully functioning data processing system, those of ordinary skill in the art will appreciate that some of the processes associated with the present invention are capable of being distributed in the form of instructions or other means on a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing email messages, the method comprising:
   receiving an email message comprising a destination email address and a source email address; retrieving a local-part portion of the destination email address; retrieving a local mailbox identifier from the local-part portion of the destination email address; in response to a determination that one or more characteristics of the email message satisfy one or more email acceptance criteria that are encoded within the local-part portion of the destination address, delivering the email message in accordance with the local mailbox identifier; decrypting the local-part portion of the destination email address using a cryptographic key; and decoding a set of email acceptance parameter values in the local-part portion of the destination email address.

2. The method of claim 1 further comprising:
   identifying an email acceptance criterion as a validity date in the set of email acceptance parameter values; and
   determining that a date value that is associated with the email message is less than or equal to the validity date.

3. The method of claim 2 wherein the validity date is an unencrypted value within the local-part portion of the destination email address.

4. The method of claim 1 further comprising:
   identifying an email acceptance criterion as a retrieved reduction value in the set of email acceptance parameter values; and
   determining that the retrieved reduction value can be computed from the source email address.

5. The method of claim 4 further comprising:
   retrieving a domain name from the source email address;
   computing a reduced value using the domain name as an input value to a reduction algorithm; and
   comparing the computed reduced value against the retrieved reduction value.

6. An apparatus for processing email messages, the apparatus comprising: means for receiving an email message comprising a destination email address and a source email address; means for retrieving a local-part portion of the destination email address; means for retrieving a local mailbox identifier from the local-part portion of the destination email address; means for delivering the email message in accordance with the local mailbox identifier in response to a determination that one or more characteristics of the email message satisfy one or more email acceptance criteria that are encoded within the local-part portion of the destination address; means for decrypting the local-part portion of the destination email address using a cryptographic key; and means for decoding a set of email acceptance parameter values in the local-part portion of the destination email address.

7. The apparatus of claim 6 further comprising:
means for identifying an email acceptance criterion as a validity date in the set of email acceptance parameter values; and
means for determining that a date value that is associated with the email message is less than or equal to the validity date.

8. The apparatus of claim 7 wherein the validity date is an unencrypted value within the local-part portion of the destination email address.

9. The apparatus of claim 7 further comprising:
means for identifying an email acceptance criterion as a retrieved reduction value in the set of email acceptance parameter values; and
means for determining that the retrieved reduction value can be computed from the source email address.

10. The apparatus of claim 9 further comprising:
means for retrieving a domain name from the source email address;
means for computing a reduced value using the domain name as an input value to a reduction algorithm; and
means for comparing the computed reduced value against the retrieved reduction value.

11. A computer program product on a computer readable medium for use in a data processing system for processing email messages, the computer program product comprising:
means for receiving an email message comprising a destination email address and a source email address;
means for retrieving a local-part portion of the destination email address;
means for retrieving a local mailbox identifier from the local-part portion of the destination email address; means for delivering the email message in accordance with the local mailbox identifier in response to a determination that one or more characteristics of the email message satisfy one or more email acceptance criteria that are encoded within the local-part portion of the destination address; means for decrypting the local-part portion of the destination email address using a cryptographic key; and means for decoding a set of email acceptance parameter values in the local-part portion of the destination email address.

12. The computer program product of claim 11 further comprising:
means for identifying an email acceptance criterion as a validity date in the set of email acceptance parameter values; and
means for determining that a date value that is associated with the email message is less than or equal to the validity date.

13. The computer program product of claim 12 wherein the validity date is an unencrypted value within the local-part portion of the destination email address.

14. The computer program product of claim 11 further comprising:
means for identifying an email acceptance criterion as a retrieved reduction value in the set of email acceptance parameter values; and
means for determining that the retrieved reduction value can be computed from the source email address.

15. The computer program product of claim 14 further comprising:
means for retrieving a domain name from the source email address;
means for computing a reduced value using the domain name as an input value to a reduction algorithm; and
means for comparing the computed reduced value against the retrieved reduction value.

* * * * *